US008284505B2

United States Patent
Wang

(10) Patent No.: US 8,284,505 B2
(45) Date of Patent: Oct. 9, 2012

(54) VOICE COIL MOTOR AND CAMERA MODULE USING THE SAME

(75) Inventor: Yu-Bin Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 355 days.

(21) Appl. No.: 12/764,961

(22) Filed: Apr. 22, 2010

(65) Prior Publication Data
US 2011/0058267 A1 Mar. 10, 2011

(30) Foreign Application Priority Data

Sep. 9, 2009 (CN) .......................... 2009 1 0306766

(51) Int. Cl.
*G02B 7/02* (2006.01)
(52) U.S. Cl. ........................................ 359/815; 359/811
(58) Field of Classification Search .................. 359/811, 359/813, 815, 819–824
See application file for complete search history.

(56) References Cited

U.S. PATENT DOCUMENTS
2010/0149666 A1* 6/2010 Liao .............................. 359/824
\* cited by examiner

*Primary Examiner* — Thomas K Pham
*Assistant Examiner* — Brandi Thomas
(74) *Attorney, Agent, or Firm* — Altis Law Group, Inc.

(57) ABSTRACT

A voice coil motor includes a movable member, a base, and a first elastic member. The movable member comprises a barrel, and a plurality of fixing posts protrudes from the bottom of the barrel. The base defines a through hole, a plurality of recessed portions, and a plurality of concavities. The axis of through hole is coaxial with the barrel. The recessed portions surround the aperture. Each of the recessed portions is arranged between two concavities. The depth of the recessed portion is less than the height of the fixing post, and the depth of the concavity is larger than that of the recessed portion. The elastic member comprises an elastic portion, which defines a first fixing hole. The fixing post extends through the first fixing hole and is received in the recessed portion.

10 Claims, 4 Drawing Sheets

VOICE COIL MOTOR AND CAMERA MODULE USING THE SAME

BACKGROUND

1. Technical Field

The present disclosure relates to motors and camera modules and, particularly, to a voice coil motor and a camera module using the voice coil motor.

2. Description of Related Art

Normally, voice coil motors include a barrel for receiving optical elements. After the optical elements have been mounted in the barrel, the voice coil motor is assembled in an electronic device. During the procedure of assembling the electronic device, the optical elements in the barrel may be mistakenly adhered to a base of the voice coil motor.

BRIEF DESCRIPTION OF THE DRAWINGS

The components of the drawings are not necessarily drawn to scale, the emphasis instead being placed upon clearly illustrating the principles of a voice coil motor and a camera module using the same. Moreover, in the drawings, like reference numerals designate corresponding parts throughout several views.

DETAILED DESCRIPTION

Figure 1:
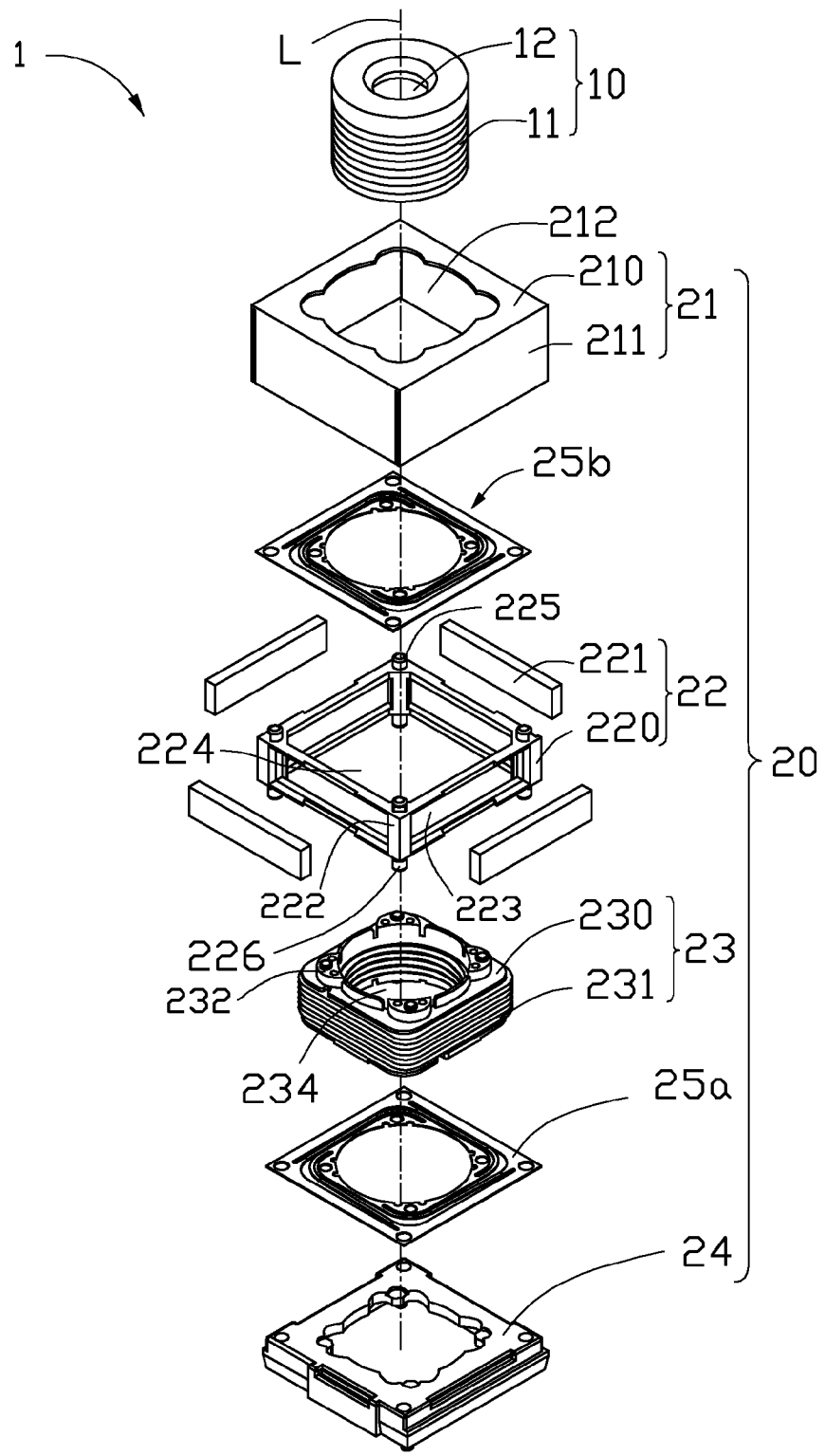
FIG. 1 is an exploded, perspective view of a camera module using a voice coil motor in accordance with an exemplary embodiment.
Figure 2:
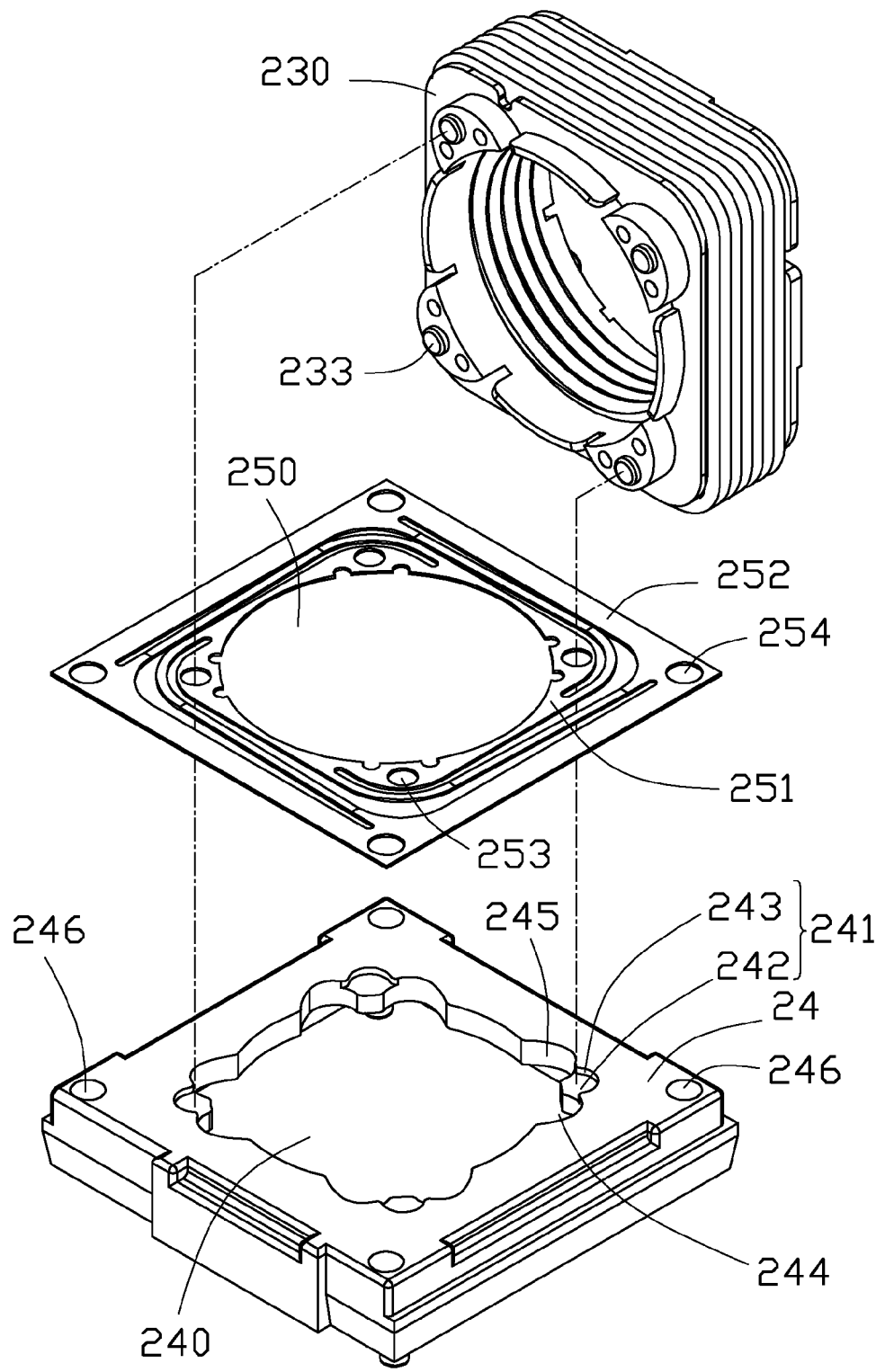
FIG. 2 is a partially exploded, perspective view of the voice coil motor of FIG. 1.
Figure 3:
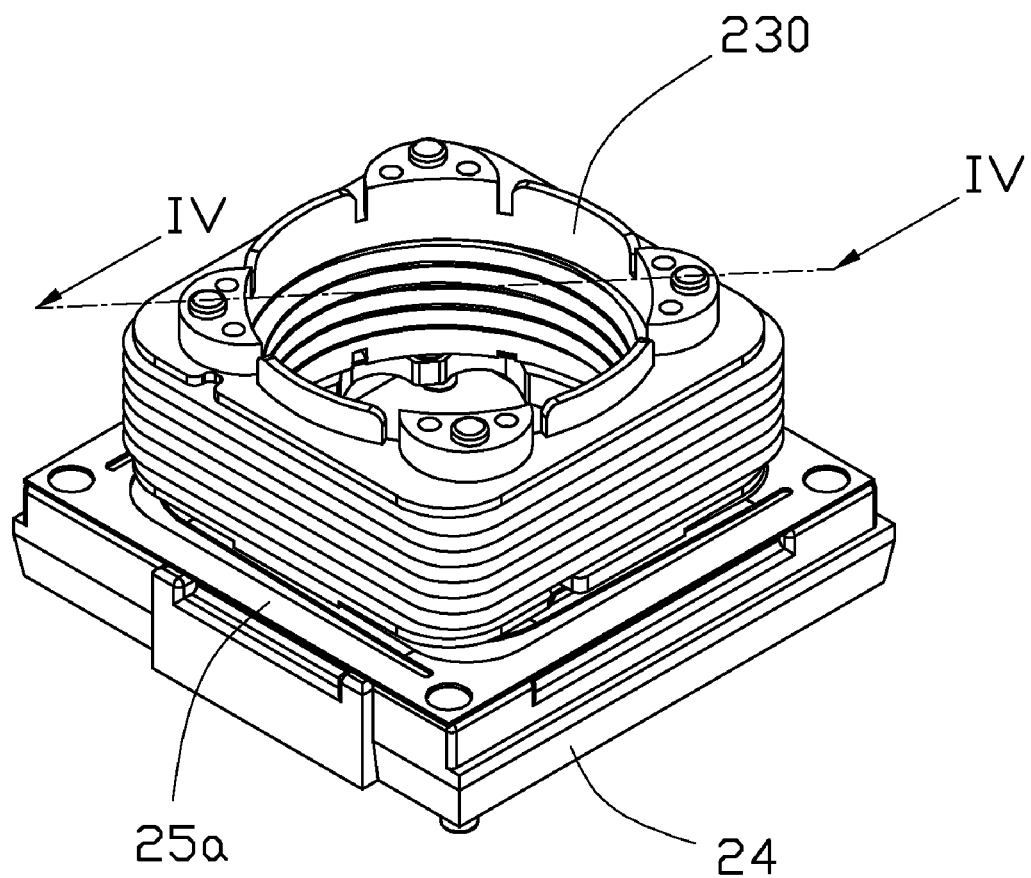
FIG. 3 is an assembled isometric view of the voice coil motor of FIG. 1.
Figure 4:
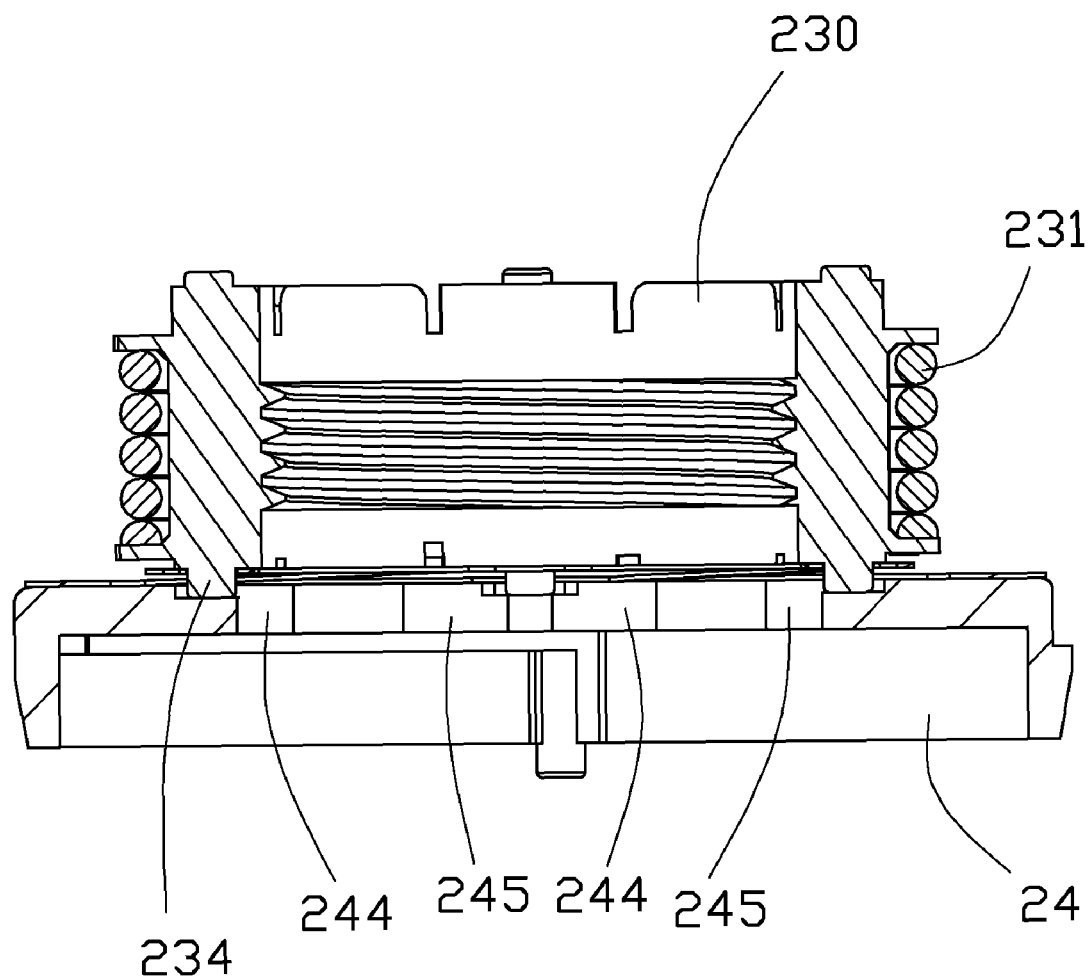
FIG. 4 is a cross-sectional view taken along line IV-IV of FIG. 3.

Referring to FIGS. 1-4, an embodiment of a camera module 1 is illustrated. The camera module 1 includes a lens module 10 and a voice coil motor 20. The lens module 10 is received in the voice coil motor 20.

The lens module 10 includes a lens barrel 11 and a lens group 12 received in the lens barrel 11. The voice coil motor 20 includes a housing 21, an immovable member 22, a movable member 23, a base 24, a first elastic member 25a, and a second elastic member 25b. In an alternative embodiment, the second elastic member 25b is omitted from the voice coil motor 20.

The housing 21 and the base 24 cooperatively form a space for receiving the immovable member 22, the movable member 23, the first elastic member 25a, and the second elastic member 25b. The lens module 10 is received in the movable member 23, and the movable member 23 is received in the immovable member 22. The first elastic member 25a is secured to the top of the immovable member 22 and the top of the movable member 23. The second elastic member 25b is secured to the bottom of the immovable member 22 and the bottom of the movable member 23.

The housing 21 includes a top plate 210 and four sideboards 211 perpendicularly secured to the top plate 210. The top plate 210 defines a first through hole 212.

The immovable member 22 includes a bracket 220 and four magnetic members 221. The bracket 220 is generally square shaped. The bracket 220 includes four sidewalls 222. Each of the sidewalls 222 defines a slot 223 to receive one of the magnetic members 221. The bracket 220 defines a receiving space 224 extending through the bracket 220 to receive the movable member 23. Four first positioning posts 225 protrude from the top of the bracket 220, and four second positioning posts 226 protrude from the bottom of the bracket 220. The first positioning posts 225 are used to fix the second elastic member 25b, and the second positioning posts 226 are used to fix the first elastic member 25a.

The movable member 23 includes a barrel 230 and a coil 231 circling the barrel 230. Four first fixing posts 232 protrude from the top of the barrel 230 to secure the second elastic member 25b to the barrel 230, and four second fixing posts 233 protrude from the bottom of the barrel 230 to secure the first elastic member 25a to the barrel 230. The barrel 230 further defines a receiving space 234 extending through the barrel 230. The lens module 10 is received in the receiving space 234 and engages with the barrel 230. The axis of the barrel 230 and the optical axis of the lens group 12 are coaxial.

The first elastic member 25a defines an aperture 250 in the center. The first elastic member 25a includes an elastic portion 251 adjacent to the aperture 250 and a fixing portion 252 surrounding the elastic portion 251. The elastic portion 251 defines four first fixing holes 253. The fixing portion 252 defines four second fixing holes 254. In the embodiment, each of the fixing posts 233 extends through one of the first fixing holes 253 and is adhered to one of the first fixing holes 253 using adhesive material to secure the first elastic member 25a to the barrel 230. Each of the second positioning posts 226 extends through one of the second fixing holes 254 and is adhered to one of the second fixing holes 254 to secure the first elastic member 25a to the bracket 220. The structure of the second elastic member 25b is the same as that of the first elastic member 25a.

The base 24 defines a second through hole 240. In the embodiment, the size of the second through hole 240 is equal to that of the aperture 250 and the first through hole 212. Four recessed portions 241 are formed on the top of the base 24 surrounding the second through hole 240. Each of the recessed portions 241 communicates with the second through hole 240. Each of the second fixing posts 233 passes through one of the first fixing holes 253 and is received in the one of the recessed portions 241. Each of the recessed portions 241 includes a bottom surface 242 and a retaining wall 243. Further movement of the movable member 23 can be prevented because the retaining wall 243 limits the movement of the second fixing posts 233, thus protecting the first elastic member 25a.

The top of the base 24 further defines four first concavities 244 and four second concavities 245. In the embodiment, the depth of each of the recessed portions 241 is less than that of the first concavities 244 and the second concavities 245. Each of the recessed portions 241 is arranged between one first concavity 244 and one second concavity 245. The first concavities 244 and the second concavities 245 are configured to receive any overflow of adhesive material used to adhere the second fixing posts 233 to the first fixing holes 253, thus the lens module 10 cannot be mistakenly adhered to the base 24. The base 24 defines four positioning holes 246. Each of the second positioning posts 226 extends through one of the second fixing holes 254 and is received in one of the positioning holes 246.

In the embodiment, the depth of each of the recessed portions 241 is less than the height of each of the second fixing posts 233. The depth of the positioning hole 246 is larger than or equal to that of the second positioning post 226. With such configuration, the fixing portion 252 of the first elastic member 25a is nearer to the top of the base 24 than to the elastic portion 251 of the first elastic member 25a, and the fixing portion 252 of the second elastic member 25b is nearer to the top of the bracket 220 than to the elastic portion 251 of the second elastic member 25b. That is, the first elastic member 25a and the second elastic member 25b are in a deformed state without current being supplied to the coil 231. Therefore, when an external force is exerted on the camera module 1, for example, when the camera module 1 is shaken, the movement of the lens module 10 can be limited due to the spring force of the first elastic member 25a and the second elastic member 25b. When a current is supplied to the coil 231, the lens module 10 is driven as usual.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A voice coil motor, comprising:
a movable member comprising a barrel, wherein a plurality of fixing posts protrude from a bottom of the barrel;
a base defining an aperture, a plurality of recessed portions, and a plurality of concavities, wherein an axis of the aperture is coaxial with that of the barrel, the recessed portions surround the aperture, each of the recessed portions is arranged between two concavities, the depth of each of the recessed portions is less than the height of each of the fixing posts, the depth of each of the concavities is larger than that of each of the recessed portions;
a first elastic member comprising an elastic portion, wherein the elastic portion defines a plurality of first fixing holes, each of the first fixing holes corresponds to one of the fixing posts, each of the fixing posts extends through one of the first fixing holes and is received in one of the recessed portions; and
a bracket defining a receiving space to receive the movable member; wherein the elastic member comprises a fixing portion surrounding the elastic portion, the fixing portion is fixed to the bracket, a plurality of positioning posts protrudes from the bottom of the bracket, the fixing portion defines a plurality of second fixing holes, each of the second fixing holes corresponds to one of the positioning posts, the base defines a plurality of positioning holes, each of the positioning posts extends through one of the second fixing hole and is received in the one of the positioning holes.

2. The voice coil motor as described in claim 1, wherein the depth of the positioning post is larger than that of the positioning hole.

3. The voice coil motor as described in claim 1 further comprising a housing, wherein the housing cooperates with the base to receive the bracket, movable member and the first elastic member.

4. The voice coil motor as described in claim 1, wherein each of the recessed portions communicates with the aperture, each of the recessed portions comprises a bottom surface and a retaining wall.

5. The voice coil motor as described in claim 1 further comprising a second elastic member, wherein the second elastic is arranged on the top of the bracket.

6. A camera module, comprising:
a lens module; and
a voice coil motor comprising:
a movable member comprising a barrel, the barrel receiving the lens module, wherein a plurality of fixing post protruding from the top of the barrel;
a base defining an aperture, a plurality of the recessed portions, and a plurality of concavities, wherein the axis of aperture is coaxial with the barrel, the recessed portions surround the aperture, each of the recessed portions is arranged between two concavities, the depth of each of the recessed portion is less than the height of each of the fixing post, the depth of each of the concavities is larger than that of each of the recessed portion;
a first elastic member comprising an elastic portion, wherein the elastic portion defines a plurality of first fixing holes, each of the first fixing holes correspond to the fixing posts, each of the fixing posts extends through one of the first fixing holes and is received in one of the recessed portions; and
a bracket defining a receiving space to receive the movable member;
wherein the elastic member comprises a fixing portion surrounding the elastic portion, the fixing portion is fixed to the bracket, a plurality of positioning posts protrudes from the bottom of the bracket, the fixing portion defines a plurality of second fixing holes, each of the second fixing holes corresponds to the positioning post, the base defines a plurality of positioning holes, each of the positioning posts extends through the second fixing holes and is received in the positioning holes.

7. The camera module as described in claim 6, wherein the depth of each of the positioning posts is larger than that of each of the positioning holes.

8. The camera module as described in claim 6 further comprising a housing, wherein the housing engages with the base to receive the bracket, movable member and the elastic member.

9. The camera module as described in claim 6, wherein each of the recessed portions communicates with the aperture, each of the recessed portions comprises a bottom surface and a retaining wall.

10. The camera module as described in claim 6 further comprising a second elastic member, wherein the second elastic member is arranged on the top of the bracket.

* * * * *